United States Patent [19]

Kashiwase

[11] 3,997,906
[45] Dec. 14, 1976

[54] DIAPHRAGM DEVICE IN A CAMERA LENS
[75] Inventor: Toshio Kashiwase, Zushi, Japan
[73] Assignee: Nippon Kogaku K.K., Tokyo, Japan
[22] Filed: Aug. 14, 1975
[21] Appl. No.: 604,704
[30] Foreign Application Priority Data
Aug. 17, 1974 Japan .................. 49-97938[U]
[52] U.S. Cl. .................. 354/196; 354/272
[51] Int. Cl.² .................. G03B 9/07; G03B 17/12
[58] Field of Search .......... 354/270, 272, 273, 274, 354/232, 152, 36, 195, 196

[56] References Cited
FOREIGN PATENTS OR APPLICATIONS
1,285,734   1/1962   France .................. 354/270

Primary Examiner—Joseph F. Peters, Jr.
Attorney, Agent, or Firm—Shapiro and Shapiro

[57] ABSTRACT

A diaphragm device for a camera having a movable lens barrel has a diaphragm blade fixedly positioned with respect to a lens mount portion, the blade being stopped down upon occurrence of shutter release. An aperture diameter setting ring is provided for presetting the rest position of the diaphragm blade when stopped down for stopping the operation of the diaphragm blade when shutter release occurs and the blade reaches a position corresponding to the aperture preset operation. Correcting means is provided for changing the rest position of the diaphragm blade in response to axial movement of the lens barrel so that the quantity of light reaching a film surface which is determined by the stopped down position of the diaphragm blade preset by the aperture diameter setting ring assumes a predetermined value irrespective of the axial movement of the lens barrel.

5 Claims, 1 Drawing Figure

DIAPHRAGM DEVICE IN A CAMERA LENS

BACKGROUND OF THE INVENTION

1. Field of the Invention

This invention relates to an automatic diaphragm device in an interchangeable lens for a single lens reflex-type camera which has the diaphragm fixedly positioned with respect to the camera mount portion.

2. Description of the Prior Art

Conventional interchangeable lenses for cameras have adopted diaphragm blades of the type which are movable with the picture-taking lens group. However, in lenses of long focal length, the distance between the diaphragm position and the camera mount portion is long so that the amount of axial movement required of the lens during distance adjustment is great, and in brighter lenses, the aperture diameter is greater and the number of parts associated with the diaphragm is larger. For these reasons, in lenses of this kind automatization of the diaphragm also presents difficulties in terms of weight if made in accordance with the teachings of the prior art.

Even in such lenses, if the diaphragm position is fixed with respect to the camera mount portion, the number of the parts associated with the diaphragm may be reduced to permit lighter weight of the diaphragm device and this will be a great advantage in automatization of the diaphragm. However, when the diaphragm position is so fixed, the quantity of light reaching a film surface, which is determined by the diaphragm position, will vary with the axial movement of the lenses because of the different effective light beam diameters of the lenses disposed forwardly and rearwardly of the diaphragm. It then becomes necessary to effect aperture correction and obtain a predetermined F-value in order to provide an aperture diameter corresponding to the variation in the amount of light which would reach the film surface.

SUMMARY OF THE INVENTION

It is an object of the present invention to overcome the above-noted problems, and to provide a diaphragm device in a camera lens which can automatically accomplish the above-mentioned aperture correction simultaneously with distance adjustment.

According to the present invention, the diaphragm device for a camera having a movable lens barrel comprises a diaphragm blade having its position in the direction of the optical axis fixed with respect to a lens mount portion of the camera, the diaphragm blade being stopped down when shutter release occurs in response to the shutter mechanism of the camera, an aperture diameter setting member for presetting the rest position of the diaphragm blade when stopped down and for stopping the operation of the diaphragm blade when shutter release occurs and the blade reaches a position corresponding to the aperture preset operation, and correcting means for changing the rest position of the diaphragm blade preset by the aperture diameter setting member in response to axial movement of the lens barrel so that the quantity of light reaching a film surface which is determined by the stopped down position of the diaphragm blade preset by the aperture diameter setting member assumes a predetermined value irrespective of the axial movement of the lens barrel.

The correcting means may include movement direction converting means for converting the rectilinear movement of the lens barrel along the optical axis into rotation about the optical axis and for transmitting the rotational movement to the aperture diameter setting member. The movement direction converting means may be a cam mechanism. The movement direction converting means may comprise a first correcting member operatively associated with either the aperture diameter setting member or the aperture ring and has a first cam groove, and a second converting member is operatively associated with the other of the aperture diameter setting member or the aperture ring and has a second cam groove. A rotatable member has a pin cooperable with both of the first and second cam grooves, and the member is mounted for rotation in a circumferential direction about the optical axis.

The invention will become more fully apparent from the following detailed description of an embodiment thereof taken in conjunction with the accompanying drawings.

DESCRIPTION OF THE PREFERRED EMBODIMENT

Figure 1:
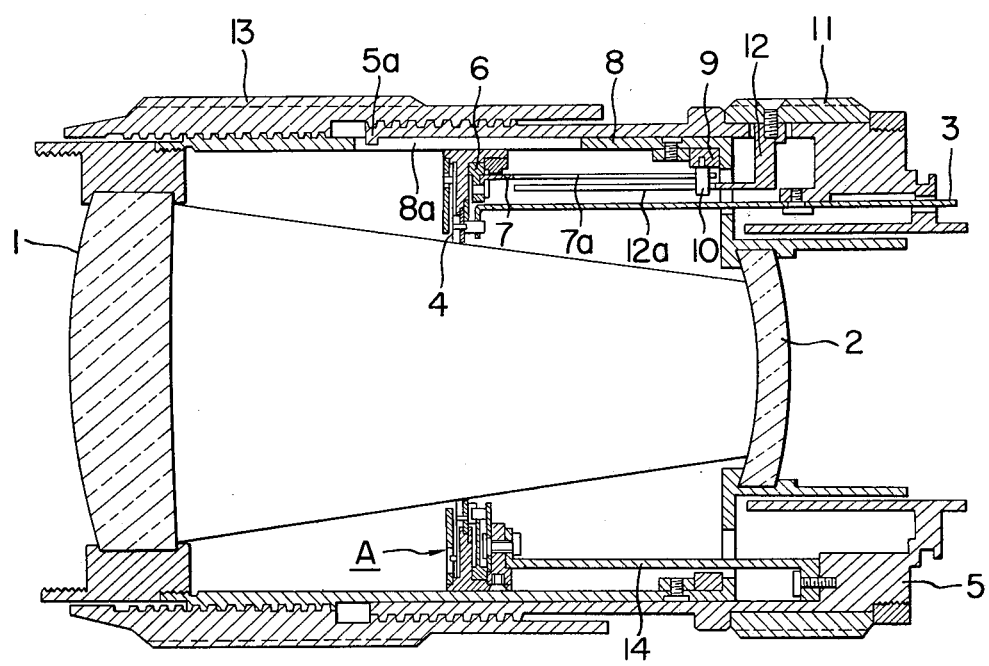
FIG. 1 is a front cross-sectional view showing an embodiment of the present invention.
Figure 2:
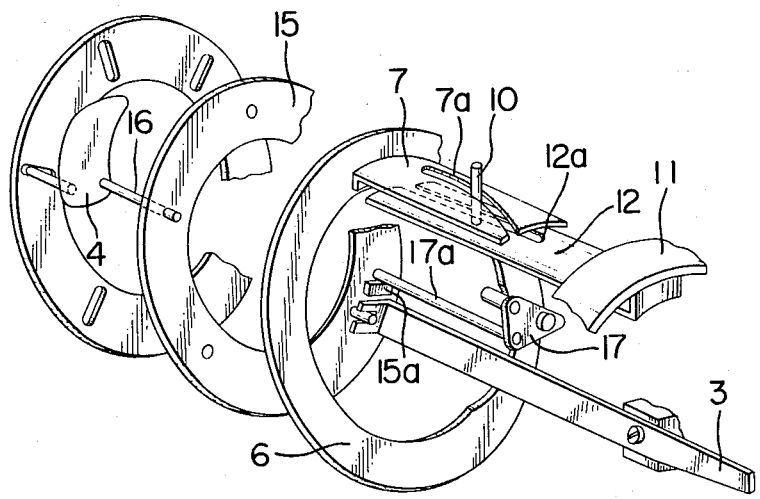
FIG. 2 is a perspective view of the essential portions of FIG. 1.

Referring to FIGS. 1 and 2, lens barrel 8 has therewithin a forward lens 1 and a rearward lens 2 with a diaphragm interposed therebetween. A conventional diaphragm mechanism A is fixedly mounted on a lens mount 5 by means of a support member 14. The diaphragm mechanism is designed so that when the lens barrel is assembled to the body of a camera, a stop-down lever 3 interlocks with the shutter mechanism of the camera, and depression of the camera shutter button causes depression of the stop-down lever 3 to stop-down a diaphragm blade 4. An aperture diameter setting member or ring 6 serves to set the so-called equally dimensioned aperture which is provided by a predetermined angle of rotation for each stage of stop-down, and is installed for rotation about the optical axis. Rotation of this aperture diameter setting ring 6 causes variation in the amount of displacement of the diaphragm blade 4 when operated.

Figure 3:
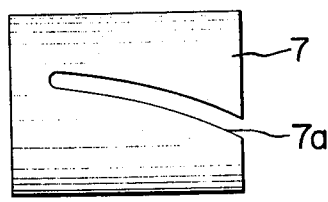
FIG. 3 is a plan view of a cam lever.
Figure 4:
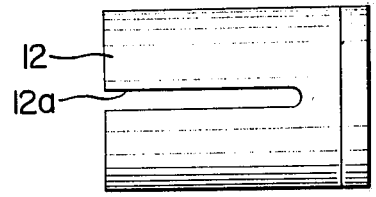
FIG. 4 is a plan view of a lever.

Correcting means is provided for changing the rest position of the diaphragm blade 4 preset by the aperture diameter setting member 6 in response to axial movement of the lens barrel 8 so that the quantity of light reaching a film surface which is determined by the stopped down position of the diaphragm blade preset by the aperture diameter setting member assumes a predetermined value irrespective of the axial movement of the lens barrel. As illustrated, a cam lever 7 is formed with an aperture correcting cam groove 7a which is curved, as shown in FIGS. 2 and 3. The cam lever has one end secured to the aperture diameter setting ring 6. A lever 12 is formed with a straight groove 12a which extends parallel to the optical axis, as shown in FIGS. 2 and 4. This lever has one end secured to an aperture ring 11. As shown in FIG. 2, the cam lever 7 and the lever 12 are in overlapping relationship. A pin 10 extending into the curved aperture correcting cam groove 7a and into the straight groove 12a is secured on a rotatable member 9 (FIG. 1) mounted for rotation within the lens barrel 8.

A distance ring 13 is threadably fitted over the forward end portion of the lens mount 5 by a helicoid in the well-known manner, and the lens barrel 8 having the lenses contained therewithin is threadably fitted within the other end portion of the distance ring 13 also by a helicoid. With the aid of a key groove or spline 8a formed in the lens barrel 8 and key or spline 5a provided at the forward end of the lens mount 5, rotation of the distance ring 13 causes rectilinear axial movement of the lens barrel 8.

When normal photography is to be carried out with the above described construction, the aperture ring 11 is first rotated to cause the lever 12 and pin 10 to revovle the cam lever 7 to thereby set the aperture diameter. Then, the distance ring 13 is rotated to axially move the lens barrel 8 for focusing. At the same time, the pin 10 moves rectilinearly along the straight groove 12a, and the coaction of the pin and the aperture correcting cam groove 7a causes the cam lever 7 to rotate to thereby rotate the aperture diameter setting ring 6 to a position for correcting the aperture diameter. A lever 17 transmits the rotation of the aperture diameter setting ring 6 to the stop-down ring 15, and has a projective pin 17a oscillating with a lug 15a of said stop-down ring 15. Thus, the aperture diameter may be automatically corrected to provide a predetermined F-value by forming the cam groove 7a of a configuration or curvature that the diaphragm blade 4 is actuated to ensure that a predetermined F-value is obtained irrespective of any variation caused in the effective light beam diameter at the position of the diaphragm by the movement of the lens barrel.

Also, by providing the aperture ring 11 so that when rotated to set the F-value it may be fixed at a set position by the utilization of a click stop action, the lever 12, will be free of any movement which would otherwise result from the reaction occurring when the pin 10 rotates the cam lever 7, whereby the back-and-fourth movement of the pin 10 will ensure the rotation of the cam lever 7.

As a matter of course, the same effect as described may be obtained by forming the aperture correcting cam groove and the straight groove in the lever 12 and the cam lever 7, respectively, or by forming cam grooves in both levers 12 and 7 so that these two coact to effect the aperture correction.

According to the invention as has been described above, a predetermined F-value may easily be obtained even in a lens of the fixedly positioned diaphragm type by correcting the aperture diameter. In addition, the diaphragm of the fixedly positioned type is simple to construct and this leads to realization of an automatic diaphragm device which is light in weight and reliable in performance.

It is believed that the advantages and improved results furnished by the diaphragm device of the invention will be apparent from the foregoing description of a preferred embodiment of the invention. Various changes and modifications may be made without departing from the spirit and scope of the invention as sought to be defined in the following claims.

I claim:

1. A diaphragm device for a camera having a movable lens barrel comprising:
    a diaphragm blade having its position in the direction of the optical axis fixed with respect to a mount portion for mounting a lens to the body of the camera, the diaphragm blade being stopped down when shutter release occurs in response to the shutter mechanism of the camera;
    an aperture diameter setting member for presetting the rest position of the diaphragm blade when stopped down and for stopping the operation of the diaphragm blade when shutter release occurs and the blade reaches a position corresponding to the aperture preset operation; and
    correcting means for changing the rest position of the diaphragm blade preset by the aperture diameter setting member in response to axial movement of the lens barrel so that the quantity of light reaching a film surface which is determined by the stopped down position of the diaphragm blade preset by the aperture diameter setting member assumes a predetermined value irrespective of the axial movement of the lens barrel.

2. A device according to claim 1, wherein the correcting means includes:
    movement direction converting means for converting the rectilinear movement of said lens barrel along the optical axis into rotational movement about the optical axis and for transmitting the rotational movement of the aperture diameter setting member.

3. A device according to claim 2, wherein the movement direction converting means is a cam mechanism.

4. A device according to claim 3, wherein the movement direction converting means comprises:
    a first correcting means operatively associated with one of said aperture diameter setting member and said aperture ring and having a first cam groove;
    a second correcting member operatively associated with the other of said aperture diameter setting member and said aperture ring and having a second cam groove; and
    a rotatable member having a pin cooperable with the first and second cam grooves and mounted for rotation in a circumferential direction about the optical axis.

5. A device according to claim 4, wherein the first correcting member is a cam lever connected to the aperture diameter setting member and the first cam groove is curved; and wherein the second correcting member is a lever connected to the aperture ring and the second cam groove extends parallel to the optical axis.

* * * * *